UNITED STATES PATENT OFFICE.

JACOB MELLINGER, OF BALTIMORE, MARYLAND.

METHOD OF MANUFACTURING ARTIFICIAL WOOD.

SPECIFICATION forming part of Letters Patent No. 504,988, dated September 12, 1893.

Application filed May 31, 1893. Serial No. 476,145. (No specimens.)

*To all whom it may concern:*

Be it known that I, JACOB MELLINGER, a citizen of the United States, residing at Baltimore, in the State of Maryland, have invented certain new and useful Improvements in Methods of Manufacturing Artificial Wood; and I do hereby declare the following to be a full, clear, and exact description of the invention, such as will enable others skilled in the art to which it appertains to make and use the same.

My present invention relates to artificial wood, and the method of manufacturing the same, which will be hereinafter described and pointed out in the claims.

The object of my invention is to produce antiseptic, flexible wood especially adapted for service as flooring, pavements for side walks, railroad ties, and many other purposes, which shall possess the desirable properties of being light in weight, fire and waterproof, and preventive of decay. Artificial wood produced in accordance with my invention is capable of being sawed, bored, planed, split in the direction of its length, or worked and used in various other ways the same as natural wood.

In the manufacture of artificial wood I utilize tan-bark, wood, straw, paper or even cotton waste as the vehicle which forms the body of the wood, and with this waste matter I incorporate certain ingredients which produce a pulp that is molded, pressed and dried, thereby producing artificial wood having the properties of flexibility, proof against fire, water and decay, and light in weight.

My composition for artificial wood consists of the following ingredients, in the proportions specified, to wit:—borax, one (1) pound; alum, two (2) pounds; carbonate of potassium, one half (½) of a pound; sulphate zinc, one half (½) of a pound; sodium chloride, three (3) pounds; bicarbonate sodium, one (1) pound; silicate of sodium, thirty (30) pounds; lye, twenty-five (25) pounds; lime, fifteen (15) pounds; water, one (1) gallon, and one hundred and fifty (150) pounds of tan bark, wood, straw, paper, cotton waste, or equivalent substances.

In carrying my invention into practice I produce a solution by dissolving in one (1) gallon of pure water, the following ingredients:—borax, one (1) pound; alum, two (2) pounds; carbonate of potassium, one-half (½) pound; sulphate zinc, one-half (½) pound; sodium chloride, three (3) pounds; and bi-carbonate of sodium, one (1) pound. I then take thirty (30) pounds of liquid silicate of sodium and thoroughly mix it with the solution above named, after which I add twenty-five (25) pounds of lye, of thirty-five per cent. (35%).

I prefer to use spent tan bark as the vehicle for the chemicals and which forms the body of the product, although either of the other waste substances hereinbefore named may be used in lieu thereof. I take one hundred and fifty pounds of spent tan bark which is thoroughly dried and pulverized. With this tan bark is thoroughly mixed fifteen pounds of slaked lime which has been previously dried and pulverized. To this mixture of tan bark and lime, I add the solution previously prepared and mix the mass very thoroughly by stirring or agitating it, to produce a pulp. The pulp thus formed is placed in any suitable kind of mold and is subjected to pressure, after which it is removed and dried. I prefer to subject the pulp while in the molds to a pressure of three hundred (300) tons, but I do not strictly confine myself to this particular pressure as the same can be varied.

The carbonate of potassium and lye incorporated with the fibrous material to produce the pulp from which the product is made by molding under pressure, serve to render the wood flexible or pliable, and in this connection I do not strictly limit myself to the use of ingredients to render the wood antiseptic, water proof and fire proof.

The sulphate of zinc and sodium sulphate render the wood waterproof; alum and silicate of sodium make it fire proof; sodium chloride and bi-carbonate of sodium render the wood antiseptic, and the lime and silicate of sodium are the binding mediums to cause the mass to adhere, the latter (silicate of sodium) also serving as an incombustible agent.

It is evident that the proportions of some, if not all, of the several ingredients can be changed without departing from the spirit or sacrificing the advantages of my invention, and I therefore reserve the right to make such changes as fairly fall within the scope of my invention.

Having thus fully described my invention, what I claim as new, and desire to secure by Letters Patent, is—

1. The process of making artificial wood which consists in mixing lime with a fibrous material; producing a solution containing borax, alum, carbonate of potassium, sulphate zinc, sodium chloride, bicarbonate sodium, silicate of sodium, and lye; producing a pulp by mixing said solution with the lime and fibrous material, and finally molding the pulp and subjecting it to pressure, substantially as and for the purposes described.

2. A composition of matter for making artificial wood, consisting of a suitable fibrous material, borax, alum, carbonate of potassium, sulphate of zinc, sodium chloride, bicarbonate of sodium, silicate of sodium, lye, lime and water, substantially as and in the proportions specified.

In testimony whereof I affix my signature in presence of two witnesses.

JACOB MELLINGER.

Witnesses:
 JOS. FORREST,
 H. T. BEMHORD.